Patented Sept. 14, 1948

2,449,058

UNITED STATES PATENT OFFICE 2,449,058

PLASTICIZING AND VULCANIZATION OF BUTADIENE-ACRYLIC NITRILE COPOLYMER

Loring Coes, Jr., Brookfield, Mass., assignor to Norton Company, Worcester, Mass., a corporation of Massachusetts No Drawing. Application December 27, 1945, Serial No. 637,490

6 Claims. (Cl. 51—298)

This invention relates to the plasticizing and vulcanization of that type of synthetic rubber which, in its more usual form, comprises the copolymer of butadiene with acrylic nitrile; numerous difficulties have been heretofore encountered in working up and plasticizing this material, and to vulcanize it sulfur is universally employed.

One of the objects of this invention is to facilitate the plasticizing and vulcanization of the aforesaid type of synthetic rubber, to improve the workability thereof as on mill rolls or in mixers, to facilitate the admixture therewith of other ingredients such as fillers, pigments, refractory grains, and the like, and to improve the vulcanization thereof. Another object is to achieve vulcanization by agents that may be used instead of sulfur and thus avoid certain disadvantages attendant upon the use of sulfur. Another object is to provide good plasticizing agents and a method to cause them to function also as vulcanizing agents, and a method of treating the said rubbery type of compound, to produce at will a vulcanizate of any desired degree of hardness, within ranges from the Ebonite type of hardness to vulcanizates of extreme softness. Another object is to carry out the above-mentioned objects by ingredients and methods that will not impair or detrimentally affect known desirable properties of the vulcanizates, such as good resistance to heat and petroleum products, good dielectric properties, tensile strength, resistance to deterioration, and the like.

Another object is to provide a dependable and practical method of treatment of the aforesaid type of copolymer to prepare it for conversion, particularly where fillers and other additions are to be added, into useful forms or shapes, to provide for its vulcanization in an efficient and commercially practicable manner. Another object is to provide good plasticizing agents for the said type of copolymer that can function efficiently in liquid form during working up of the copolymer with or without fillers or additions and thereby achieve a much sought-after plasticity of the copolymer or mix, thus to facilitate and materially expand practical uses and applications of this compound, and to provide a method of making these plasticizing agents, which normally have no vulcanizing effect upon the copolymer, capable of vulcanization reaction therewith. Another object is to provide plasticizing agents for the Perbunan type of copolymer which can also be made to function as vulcanizing agents. Another object is to provide an aforesaid type of vulcanizate that will be free from such disadvantages as are inherent in the sulfur-vulcanized produce and that can be produced without the disadvantages imposed upon sulfur as a vulcanizing agent. Another object is, in general, to provide an improved and better process for producing the aforesaid types of vulcanizates and to produce dependable vulcanizates within a wide range of characteristics well adapted to meet the widely varying requirements of practical use. Other objects will be in part obvious or in part pointed out hereinafter.

The invention, accordingly, consists in the features of construction, combinations of elements, arrangements of parts, and in the several steps and relation and order of each of said steps to one or more of the others thereof, all as will be illustratively described herein, and the scope of the application of which will be indicated in the following claims.

The rubbery copolymer of butadiene and acrylic nitrile, vulcanizable with sulfur, has become widely known. Heretofore vulcanizates have been achieved by effecting vulcanization of the copolymer by the use of sulfur, and it is recognized that this copolymer breaks down, as when worked on mill rolls, only with substantial difficulty and that various expedients have been resorted to in the endeavor to facilitate this breaking down or to achieve plasticizing during working on mill rolls or in mixers. This resistance to plasticizing, in turn, complicates working into the mix of fillers, pigments, and various other additives, most, if not all, of which are in dry or powdered or granular form, with the result that the mix, instead of plasticizing or becoming plastic or flowable, becomes crumbly and frequently breaks up or disintegrates into lumps. The addition of sulfur as a vulcanizing agent does not ameliorate these conditions or difficulties. It is such deficiencies in known practices of compounding mixes with the copolymer that my invention aims to overcome, and the practice of my invention is best illustrated with respect to the acrylic nitrile copolymer of butadiene.

I have discovered that esters can serve well as plasticizers, apparently largely or solely by physical action, on the acrylic nitrile copolymer and that, never heretofore regarded or considered as vulcanizing agents, they can be made, according to my invention, to react with the copolymer in the presence of a suitable catalytic agent, reacting with the polymer at or with the nitrile group or groups. I am thus enabled to employ one and the same agent for both plasticizing the acrylic nitrile copolymer, as on mill rolls or in a mixer, and with the aid of a catalyst to effect vulcanization of the copolymer under suitable heat treatment. These esters are esters of alcohols containing from two to six carbon atoms selected from the group consisting of the alkyl, alkoxy alkyl, hydroxy alkyl, alicyclic, aromatic and heterocyclic alcohols and dicarboxylic acids containing from two to ten carbon atoms. These esters, of which numerous illustrative examples are hereinafter set forth, are in both liquid and solid form when initially applied to the copolymer on mill rolls or in a mixer, having rapid and excellent plasticizing action, and thus also greatly facilitate the matter of working into the copolymer of additions such as fillers of various kinds, including reinforcing fillers, active fillers, pigments, and other materials in the nature of fillers as are employed generally in compounding or manufacture of products made of natural and synthetic rubbers. They are heretofore unknown as possible vulcanizing agents for this copolymer, but since I am enabled to cause them to function as vulcanizing agents, no addition in the nature of known vulcanizing agents such as sulfur need be made and thus the otherwise added step of incorporating finely-divided sulfur can be eliminated and processing facilitated.

The plasticizing and potential vulcanizing agents of my invention, as above noted, are numerous; they serve as good plasticizers and by a catalytic action (in both of these respects they distinguish from sulfur which is the heretofore commercially employed vulcanizing agent for the aforesaid type of copolymer), I am enabled to cause them to react under heat treatment or cure with the polymer at or with the nitrile group or groups. This action is one of polymerization or of linking or cross-linking at points or places in the copolymer with which sulfur as a vulcanizing agent does not react or link. Sulfur does not react with or at the nitrile groups, and its reaction takes place on double bonds of CH groups.

Illustrative esters of the above-mentioned class comprise the following:

1. Diethyl oxalate
2. Diethyl malonate
3. Diethyl adipate
4. Diethoxy ethyl phthalate
5. Di($\beta$ hydroxy ethyl) maleate
6. Di($\beta$ hydroxy ethyl) oxalate
7. Dibutyl sebacate
8. Dicyclohexyl sebacate In general, the esters of di-basic acids such as oxalic, malonic, succinic, glutaric, adipic, suberic, azelaic, sebacic, and phthalic acid with alcohols such as methyl, ethyl, propyl, butyl, amyl, hexyl, octyl, cyclohexyl, and furfuryl alcohol, function according to my invention in the presence of a suitable catalyst, as later described, and as examples of these esters may be further mentioned the following:

9. Dibutyl succinate
10. Dimethyl adipate
11. Dibutyl adipate
12. Dibenzyl glutarate
13. Diethyl tartrate
14. Diethyl itaconate
15. Dibenzyl phthlate
16. Dicyclohexyl succinate
17. Difurfuryl phthlate Where any of the esters are in a solid form, they are added to the mass of the rubbery copolymer by first breaking them up into suitably small particles, for example, approximating pulverized condition, so as to facilitate initial incorporation thereof into the mass being worked in the mixer or on mill rolls whence the heat of the mix melts them and thus in liquid form they plasticize the mass and are readily dissolved therein. For example, some of the solid substances have a melting point on the order of 50° C., yet under the heat of mechanical working of the mass of the copolymer, they are quickly converted to liquid form. Mechanical working is continued until the ester, whether added in liquid or solid form to the mix, is substantially dissolved by the latter and homogeneity or uniform plasticity throughout the mass is achieved.

As above pointed out, these substances, while good plasticizing agents for the copolymer, will not effect vulcanization thereof, but I have discovered how to cause them to effect vulcanizing reaction and this I achieve by the use of a catalyst which is preferably added at this stage, while the mix is still on the mill rolls or in a mixer, such as a Banbury mixer. The catalyst may also be in either solid or liquid form, usually solid, as later explained. As a catalyst I may employ any strong acid, but preferably I employ a substance which is not acid at room temperature but, upon heating, becomes active as an acid or is converted to a form in which it can act as a catalyst. This preference is carried out so that, particularly in such cases where it is desired or necessary to store or hold over a compound or prepared mix of uncured stock, thus making it possible to avoid initiating or carrying on of any material reaction during the period of storage, the storage being at room or ordinary temperature, of course.

For example, oxalic acid, sulphamic acid, and toluene sulphonic acid are illustrative of a number of acids which are solid at ordinary temperatures and which I can employ so that they do not become active until the cure of the mix is commenced.

Or, as catalysts, I may use substances which liberate acids at temperatures materially or appropriately above room temperatures, such as the temperature of the subsequent cure of the mix. Polyvinylidene chloride is an illustration of such a substance, in that it does not liberate hydrochloric acid at ordinary temperatures but effects its liberation at temperatures which are suitable for curing of the mix, such as in the neighborhood of 100° C. or 150° C. It happens also to be a solid at room temperature. Other illustrative substances of this character are salts of ammonia, such as ammonia hydrochloride; also amines with inorganic acids such as amine hydrochloride, including hydrochlorides of aromatics and aliphatics such as aniline hydrochloride, ethyl amine hydrochloride, methyl amine hydrochloride, etc.

It is advantageous and preferred to use substances or compounds such as the above-mentioned chlorides which liberate hydrogen chloride as a gas, during the curing stage, for the liberated gas well permeates the mix or molded mass and thus better uniformity of distribution throughout the mass is achieved and the catalytic action is thus also uniform.

As above noted, when the substance that is to provide the catalytic action or the catalyst is in solid form, it is ground up or comminuted in any suitable way and mixed into the mass during working of the latter, as on mill rolls or in the mixer so as to uniformly distribute the material throughout the mass and prepare it for uniformly distributed catalytic action during the subsequent cure or heat treatment. As will now be clear, the ingredient or substance that is the catalyst or is to provide or liberate the catalyst, is preferably added to the mix during the working up of the mix and may be added thereto in any suitable manner, conveniently in the same way as other ingredients such as fillers, etc., etc., are added, and preferably the addition is made after plasticization of the mix by the esters has been substantially completed. Fillers, if used, may be added at the same time that the ester is added, particularly if the latter is in liquid form, in which case also the plasticizing agent and the filler may be added together as by making a paste-like mix of the liquid ester and the filler and adding the two in the form of such a paste-like mix. If the ester is in solid form, it is preferably comminuted and in such form added to the mix, as earlier above described, and the filler added as soon as the solid ester becomes liquid and dissolved into the mix or, in other words, as soon as the ester has plasticized the mass suitably for taking up of the filler. Usually about ten minutes mixing in a Banbury mixer or a commensurate period of time working on mill rolls is appropriate. Anti-oxidants, in case it is desirable to employ them, can be added to the mix in any suitable way or at any appropriate time during mixing or working, and, for example, they may be added when the plasticizing and catalytic-responsive potential vulcanizing ester is added. Accelerators can be omitted, if desired, and preferably are so omitted in view of the action of the catalyst according to my invention.

An advantage of my invention is that the processing of the nitrile type of copolymer, in the unvulcanized state, is greatly simplified and facilitated, and is readily adaptable, accompanied by such simplification, to the use of apparatus or equipment heretofore employed in the processing of natural rubber in its unvulcanized state. For example, the step of plasticizing and the steps of adding other ingredients or materials may be carried on in a Banbury mixer, or on mill rolls, or such equipment may be used in succession. For example, the step of plasticizing may be done in a Banbury mixer and some additives added to the mix, followed by working in a kneader, and in such case, according to the character of ultimate product desired, other materials can be added to the mix while on the mill rolls or in the kneader.

The mass, which, as will now be clear, includes the ester and the catalyst or potentially-active catalytic agent, is then molded or shaped in any suitable way and subjected to heat treatment to effect reaction of the catalytically-responsive ester with the butadiene copolymer at the nitrile group or groups of its molecules, the reaction commencing promptly where the mix includes an active catalyst, and where the mix includes a potentially-active catalyst material or carrier, the catalyst is brought into action, for example, in such ways as are earlier above described. Heat treatment is variable as to time and temperature, and, for example, may be carried on at a temperature from 100° C. to about 160° C., and the time of heat treatment may be from several hours to twenty hours or more, these factors being variable according to a number of factors above and later pointed out.

A wide range of temperatures and time periods of heat treatment is available, according to the selected ester, the selected catalytic agent, and various factors. For a given combination of the butadiene-acrylic nitrile copolymer and ester (such as any one of the examples set forth in the illustrative table given above) and catalytic agent (such as any one of the examples above set forth), the time period of the cure can be made longer if a less soft or harder vulcanized product is desired, and in such case also the temperature of the cure may be made higher or may be made to increase progressively with time. However, degree of hardness of the ultimate vulcanizate is preferably determined, at least in part, or, for a given or preferred temperature and time cycle of heat cure, may be entirely determined by correspondingly varying the ratio of plasticizing-vulcanizing ester to the copolymer for a given catalytic agent, increasing the ratio with the desired increase in hardness. Thus, for example, for a relatively soft vulcanizate or end product, from 20 to 30 parts of the ester to 100 parts of the copolymer may be employed for a given catalytic agent, and for a relatively hard vulcanizate the ratio may be increased to from 50 to 60 parts of one to 100 of the other; between these general limits, which are not necessarily critical, other ratios may be adopted, of course, according to intermediate degrees of hardness desired.

These generally stated ranges of upper and lower limits are necessarily somewhat wide because, in turn, some of the esters are more reactive at the nitrile group or groups than others and thus achieve corresponding magnitudes of cross-linking, other conditions being the same. For example, of two esters the one that has the lower molecular weight gives more cross-linking, and thus a lesser quantity or proportion of it may be employed or the temperature of cure may be reduced or the time period of cure may be shortened.

Another variable, controllable at will, is the catalyst. In general, it is employed in an amount ranging generally from about 1 to 10 parts per 100 parts of the copolymer. Some of the catalysts or catalytic agents or carriers are more effective or active than others, and the amount to be used can be varied accordingly for achieving any desired characteristic in the vulcanizate. In some instances the temperature of the cure may be varied according to the characteristic of the catalytic agent or its carrier, depending, for example, upon the temperature at which the carrier or convertible ingredient or substance liberates the acid which is the direct catalytic agent. Thus, for example, if such a substance liberated the acid catalyst at a temperature of, say 130° C., one would not use a temperature of cure below that value, of course. The amount of catalyst or potentially-active catalytic agent to employ can be varied, of course, according to the degree of hardness desired in vulcanizate. For example, for a given amount of ester, present in sufficient quantity to give a certain extent of cross-linking with the butadiene-nitrile copolymer, the extent of such cross-linking for a given cycle of heat cure, as will now be clear, can be reduced by correspondingly reducing the amount of catalyst made available during cure, or by using a catalytic or catalyst-carrying agent that is less active than others.

A wide flexibility of practical operating conditions is thus available and that has the advantage, among others, that the corresponding wide choice or selection makes it possible to suit, to the manufacture of a given vulcanizate, a procedure best adapted thereto from such viewpoints as efficiency and cost of production.

With the use of esters of the above-identified kind, being the alkyl, alkoxy akyl, and hydroxy alkyl esters of dibasic acids, made to serve as vulcanizing agents by catalysts as above described, I have made a large number of combinations thereof with butadiene-nitrile copolymer, in varying or differing relative proportions within the ranges above set forth and under heat treatments as above indicated, and satisfactory vulcanizates have been produced within a widely varying range of characteristics, particularly as to hardness, falling within the range which might be compared to a range from relatively soft rubber to hard rubber. So satisfactory is the processing and vulcanization, all within the constructions above set forth, that it is not believed to be necessary to set forth, as examples, these many combinations of ingredients and their relative proportions and heat treatments because they are exceedingly numerous, because I have fully and clearly described above the practice of my invention and the manner in which variables may be introduced or effected according to the results desired or according to such factors as desirability, latitude, or range of temperature and time of the heat treatment. The vulcanizates can be made to have satisfactory tensile strengths and moduli of rupture. For example, using butadiene-acrylic nitrile copolymer in the commercial form, 100 parts of the latter, 30 parts of dibutyl sebacate, 140 parts of clay, 1 part of stearic acid, and 5 parts of polyvinylidene chloride as the catalyst (all of the parts being by weight), were mixed and molded, following the procedures above described, and subjected to a heat cure for thirty minutes at 170° C., giving a satisfactory vulcanizate that had a tensile strength of 2060 pounds per square inch and a modulus of 960 pounds per square inch. Lessening the proportion of catalytic agent, in other examples produced, gave satisfactory vulcanizates in which the tensile strength and the modulus were less than the figures just set forth, these vulcanizates being suitable for use where these lessened values of strength and modulus are desired or appropriate according to the particular uses to which the vulcanizates may be put. The esters numbered 1 to 8 inclusive, in the illustrations earlier above set forth, are more common and more readily available on the market and with them I have produced many satisfactory vulcanizates; they, as well as others specifically named, are set forth, as above indicated, as a goodly number of illustrative members of the specific class of esters above described which function satisfactorily according to my invention.

All of the di-basic acid esters have the characteristics above set forth of reacting at the nitrile group or groups of the butadiene copolymer and have structural characteristics that make possible such reaction and linking or polymerization with the copolymer at the nitrile group or groups thereof.

The esters of the class above described and that function as vulcanizing agents in the presence of a catalyst may be written thus:

The butadiene copolymer having the nitrile group may be represented thus:

A vulcanizing effect is achieved by a reaction which may be written thus:

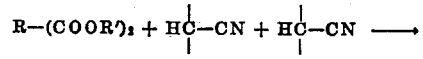

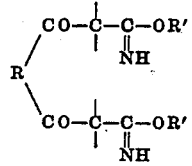

In the above formulae or reactions, R is any divalent alkyl or aryl group containing not more than eight carbon atoms, and R' is any monovalent alkyl group, or aryl group, or hydroxy alkyl group, or hydroxy aryl group, or alkoxy alkyl group, or halogenated aryl or alkyl group, or a heterocyclic group, containing not more than eight carbon atoms.

Between the highly resilient vulcanizate and the hard vulcanizate above described, and either can contain fillers, pigments, or the like, as will also be clear, a wide range of intermediate vulcanizates can be produced, as will now also be clear in view of all of the foregoing.

As above noted I have made a vast number of satisfactory vulcanizates according to my invention; in addition to those examples heretofore set forth, and of the many actually produced by me heretofore, the following are additionally illustrative and show how, other factors such as the catalyst remaining the same, variability of certain characteristics of the vulcanizates may be achieved by appropriate selection of the vulcanizing ester. Thus, I made up similar mixes, each consisting of 85 gm. of the copolymer, namely, butadiene acrylic nitrile copolymer, 15 gr. of the ester plasticizing and vulcanizing agent, 593 gm. of 80 grit size of fused alumina, and, for the catalytic agent, polyvinylidene chloride in an amount that was 1% by weight of the other ingredients. In each case, the mixes were molded and the heat cure was for 16 hours at 160° C. The resultant specimens were then subjected to a "penetration" test in which the extent of penetration of a suitable tool, exerted under the same force and conditions against the final products or specimens, was measured as to each, with the following results:

| Vulcanizate vulcanized with— | Penetration |
|---|---|
| (a) Diethoxyethyl phthalate | 13 |
| (b) Diethyl Oxalate | 23 |
| (c) Dibutoxyethyl phthalate | 35 |
| (d) Dibutyl Sebacate | 22 |
| (e) Dibutyl phthalate | 35 |
| (f) Dicyclohexyl phthalate | 30 |
| (g) Dimethoxyethyl phthalate | 24 |
| (h) Dioctyl phthalate | 45 |
| (i) Ethyl Adipate | 19 |

All of the vulcanizates were satisfactory and good; example (a), with a penetration factor of 13, was relatively hard but somewhat yieldable or resilient, and with increase in penetration factor, there was a decrease in hardness and increase in yieldability or resiliency, example (h)

of the above group having the highest resiliency with a factor of 45, it being noted that the maximum penetration which the testing equipment used could measure, was about 50.

A duplicate set of mixes like those of examples (a) to (i) was also made but omitting the catalyst, and molded and heat treated in the same way. This was to determine the action of the esters without the catalytic effect; these specimens were unsatisfactory and, in fact, of no use, being devoid of suitable tensile strength or modulus or other characteristics of a good vulcanizate. On penetration tests like those above set forth, each gave a penetration factor of infinity in conformity with the still plastic character of the material of the specimens. In short, there was no appreciable or effective vulcanization in these specimens. Substantially similar negative results were achieved upon the making and similar heat-curing of two specimens in both of which the ester vulcanizing agent was omitted, in one of which the catalytic agent was included and in the other of which it was omitted; both showed no vulcanization and on penetration tests, the factors were infinity. The latter tests show the heat treatment of the Perbunan type of copolymer alone and the heat treatment thereof in admixture with the catalytic agent achieve no appreciable or effective vulcanization, all in contrast to the vulcanizates achieved by my invention in effecting reaction of the esters of the above-mentioned class, in the presence of a catalytic agent, with the copolymer at the nitrile groups of the latter.

The data above set forth with respect to examples (a) to (i) indicates also how other factors may be varied to achieve change in one or more characteristics of the vulcanizate, all as earlier above described. For example, in example (h) the penetration of 45 shows the soft or resilient characteristic of the specimen; it was made by using a certain proportion of catalyst, as above pointed out. By increasing the amount of catalytic agent, or by employing a more active catalytic agent, the cross-linking during the cure is enhanced and the product is less soft and hence harder.

It will thus be seen that there has been provided by this invention a method and product in which the various objects hereinbefore set forth, together with many thoroughly practical advantages, are successfully achieved. Aside from the advantages above specifically mentioned, it might be noted that the known characteristic of the aforesaid types of vulcanizates in being oil resistant, and many other desirable characteristics of such vulcanizates, all of which vulcanizates have heretofore been achieved only by vulcanization with sulfur, are not impaired in achieving plasticization and vulcanization according to my invention.

Another practical advantage achieved by my invention is that the weakening effects which softeners as heretofore employed have upon the vulcanizate or end product, are avoided in the vulcanizates of my invention. Softeners or the like employed according to known procedures remain, after cure, as physical entities distributed substantially uniformly throughout the vulcanizate, and it is due to that fact that weakening results. For example, their presence as such can be shown by the fact that they can be extracted or dissolved, as by petroleum oils or the like. Such defects, however, are absent in the vulcanizates of my invention because such softeners need not be employed, and the agents which I employ to plasticize the copolymer in the unvulcanized state react with the copolymer and become part of the chemical and physical structure of the vulcanizate. Hence such weakening effects are absent and my vulcanizates achieve substantial permanency of characteristic in so far as avoiding the possibility of such changes taking place as follow when commonly-used softeners are employed and dissolved out or extracted by petroleum oils or products including gasoline.

Moreover, it will be seen that my invention provides or permits wide flexibility of adaptation, both as to processing and curing treatments, and as to physical properties of the vulcanizates, to suit or meet a wide range of practical needs or requirements. Also, it will be seen that more convenient and more efficient production of vulcanizates by the use of the butadiene-nitrile copolymer is possible.

As various possible embodiments might be made of the mechanical features of the above invention and as the art herein described might be varied in various parts, all without departing from the scope of the invention, it is to be understood that all matter hereinbefore set forth is to be interpreted as illustrative and not in a limiting sense.

I claim:
1. The method of curing butadiene - acrylic nitrile copolymer which comprises preparing a mix of said copolymer, an ester of an alcohol containing from two to six carbon atoms selected from the group consisting of the alkyl, alkoxy alkyl, hydroxy alkyl, alicyclic, benzyl and furfuryl alcohols and a dicarboxylic acid containing from two to ten carbon atoms, and a catalyst which is non-acidic at temperatures below room temperature but which provides acid selected from the group consisting of hydrochloric acid, sulphamic acid and toluene sulphonic acid at temperatures of 100° C. and above and which acid catalyst is solid at room temperature, the combination of said ester and the acid catalyst being the sole curing agent, and after a thorough mixing of the above heating to a temperature of at least 100° C. thereby producing a cured rubberlike copolymer.

2. The vulcanizate prepared by the method of claim 1.

3. An abrasive product comprising abrasive grains bonded with a vulcanizate, said product being formed by preparing a mix of abrasive grains, butadiene - acrylic nitrile copolymer, an ester of an alcohol containing from two to six carbon atoms selected from the group consisting of the alkyl, alkoxy alkyl, hydroxy alkyl, alicyclic, benzyl and furfuryl alcohols and a dicarboxylic acid containing from two to ten carbon atoms, and a catalyst which is non-acidic at temperatures below room temperature but which provides acid selected from the group consisting of hydrochloric acid, sulphamic acid and toluene sulphonic acid at temperatures of 100° C. and above and which acid catalyst is solid at room temperature, the combination of said ester and the acid catalyst being the sole curing agent, thoroughly mixing said mix, molding to produce a desired abrasive shape and heating to a temperature of at least 100° C. thereby producing an article comprising abrasive grains bonded with the cured copolymer.

4. An abrasive product according to claim 3 wherein the ester is diethoxy ethyl phthlate.

5. An abrasive product according to claim 3 wherein the ester is diethyl adipate.

6. An abrasive product according to claim 3 wherein the ester is dibutyl sebacate.

LORING COES, JR.

REFERENCES CITED

The following references are of record in the file of this patent:

UNITED STATES PATENTS

| Number | Name | Date |
|---|---|---|
| 2,271,124 | Juve | Jan. 27, 1942 |
| 2,272,874 | Kistler | Feb. 10, 1942 |
| 2,352,705 | Garvey | July 4, 1944 |
| 2,358,694 | Evans | Sept. 19, 1944 |
| 2,405,038 | Jennings | July 30, 1946 |

OTHER REFERENCES

Rubber Age, Feb. 1941, pages 315–318.